United States Patent [19]

Jakobsen

[11] 4,136,031
[45] Jan. 23, 1979

[54] APPARATUS FOR THE RECOVERY OF LIQUID FROM A LIQUID MEDIUM CONTAINING SOLIDS

[75] Inventor: Ole M. Jakobsen, Roskilde, Denmark

[73] Assignee: A/S Kobenhavns Pektinfabrik, Lille Skensved, Denmark

[21] Appl. No.: 764,236

[22] Filed: Jan. 31, 1977

[30] Foreign Application Priority Data

Jan. 30, 1976 [DK] Denmark ............................. 407/76

[51] Int. Cl.² ...................... B01D 15/02; B01D 33/16
[52] U.S. Cl. .................................. 210/267; 210/269; 210/285; 210/297; 210/386; 210/396; 210/402
[58] Field of Search .................... 162/321, 328, 335; 210/40, 77, 80, 269, 271, 272, 285, 286, 297, 386, 391, 392, 402, 396, 265, 267

[56] References Cited

U.S. PATENT DOCUMENTS

| 1,958,279 | 5/1934 | Morgan ............................ 210/400 |
| 2,014,144 | 9/1935 | Mensing ............................ 210/80 |
| 2,046,756 | 7/1936 | Thomas ............................ 210/77 |
| 2,910,185 | 10/1959 | Wehner ............................ 210/402 |
| 3,702,297 | 11/1972 | Maksim ........................ 210/DIG. 25 |
| 3,741,388 | 6/1973 | Takahashi ............................ 210/77 |

FOREIGN PATENT DOCUMENTS

| 2408884 | 9/1975 | Fed. Rep. of Germany ........... 210/386 |
| 363505 | 2/1973 | U.S.S.R. .................................. 210/386 |

*Primary Examiner*—Charles N. Hart
*Assistant Examiner*—Peter A. Hruskoci
*Attorney, Agent, or Firm*—Watson, Cole, Grindle & Watson

[57] ABSTRACT

An apparatus for the recovery of liquid from a liquid medium containing solids includes a rotatable outer drum having a liquid-permeable drum wall and containing liquid-absorbing material, a rotatable inner wall having a liquid impervious drum wall and being mounted for rotation within and eccentrically relative to the outer drum, the drums being rotatable in the same direction into the liquid medium so as to transport the material through a compression zone in which the material is compressed so as to remove absorbed liquid therefrom and subsequently through a pressure-relief zone in which the liquid-absorbing material is allowed to expand and to absorb liquid from the liquid medium, a device or devices contacting the exterior surface of the outer drum to remove solids deposited thereon, such devices being located between the zones, and a device for collecting liquid removed from the liquid-absorbing material in the compression zone.

12 Claims, 2 Drawing Figures

APPARATUS FOR THE RECOVERY OF LIQUID FROM A LIQUID MEDIUM CONTAINING SOLIDS

BACKGROUND OF THE INVENTION

This invention relates to an apparatus for the recovery of a liquid from a liquid medium containing solids, said apparatus comprising means for contacting said liquid medium with a resilient absorbing material to absorb the liquid therein, means for removing the absorbed liquid from said resilient absorbing material by pressing and means for collecting the liquid thus removed.

U.S. Pat. No. 1,958,279 discloses an apparatus comprising a hopper for feeding sludge onto the top surface of an endless band and means for passing said band along a perforated support at which it is compressed by one or more rollers to remove liquid therefrom, said liquid being collected below said porous support. This prior art apparatus also comprises means for removing a layer of solids formed on the top surface of said endless band by doctors, and means for subsequently passing the endless band through a set of rollers in which additional amounts of liquids are removed by pressing.

A serious drawback of said prior art apparatus is that it is difficult to obtain a strong absorbing band having a mechanical strength sufficiently high to permit the band to be used over long periods of time under the severe influences to which it is subjected during its continuous movement and the squeezing operations.

The object of the invention is to provide an improved apparatus which does not suffer from the drawbacks of the prior art apparatus.

SUMMARY OF THE INVENTION

The apparatus of the invention is characterized in that it comprises an outer rotatable drum having a liquidpermeable drum wall and containing a loose liquid-absorbing material, an inner rotatable drum having a liquid-impervious drum wall and being mounted within and eccentrically relative to said outer drum, driving means for rotating the outer and the inner drums in the same direction and at least one device contacting the exterior surface of the outer drum and being adapted for removing solids therefrom, said device being mounted between the zone in which the liquid medium is contacted with the loose liquid-absorbing material and the zone in which liquid is squeezed out of the liquid-absorbing material.

The operation of the apparatus of the invention is as follows:

During the rotation of the two drums which rotation may be at the same or different speeds, the loose liquid-absorbing material is carried along with the outer drum and is compressed when it reaches the zone at which the distance between the inner surface of the outer drum and the exterior surface of the inner drum starts decreasing. During the passage through said zone, liquid which previously has been absorbed in the liquid-absorbing material, is squeezed out of said material and flows towards the exterior surface of the outer drum from which it may be collected.

The apparatus of the invention clearly differs from the above mentioned prior art apparatus in which the liquid medium to be treated is introduced directly onto the absorbing material because in the apparatus of the invention the liquid is extracted from said liquid medium while leaving back the solids contained therein.

This difference not only results in an improved absorption of liquids but also extends the time periods in which the absorbing material can be efficiently utilized. Thus, the absorbing material becomes less contaminated by solids than in the prior art apparatus in which solids tend to be deposited in the pores and interstices of the absorbing material.

The outer drum preferably extends into a container for a bath of liquid medium to be treated. This embodiment allows the absorption of liquid to take place over a relatively long period of time and simultaneously with the release of pressure exerted on the absorbing material. Therefore, the absorption becomes particularly effective.

In a further preferred embodiment of the invention a screw conveyor extending through a hole in the side wall of said container is mounted for rotation at the bottom of said container. This screw conveyor serves to remove precipitated solids from the container. By using such a screw conveyor, the precipitated solids can be removed from the container without stopping the operation of the apparatus.

The device for removing solids from the exterior surface of the outer drum preferably comprises a roller extending parallel to the axis of rotation of the outer drum and rolling on and together with said outer drum. By using such a roller, the major portion of the solids deposited on the exterior surface of the outer roller can be removed in one operation. The roller preferably has a coating of a plastics material, such as polyvinyl chloride and neoprene rubber, to which the solids deposited on the exterior surface of the outer drum adhere. This embodiment of the apparatus of the invention preferably also comprises a scraper contacting the surface of the roller in a zone opposite to the zone in which the roller contacts the outer drum.

The device for removing solids from the exterior surface of the outer drum is preferably located shortly above the surface of the bath of liquid medium to be treated.

The apparatus of the invention may also comprise additional devices such as scrapers or doctors for removing remaining solids from the exterior surface of the outer drum. When using only one additional device for removing solids from the exterior surface of the outer drum, said device is preferably a rubber scraper of lip which lightly contacts the exterior surface of the outer drum and which is located in a zone in which the absorbing material is under a slight compression. By providing the rubber scraper or lip in this zone, it will be continuously rinsed by the flow of liquid out through the outer drum wall. Since the amount of liquid required for said rinsing operation is relatively small, and since such liquid may be returned to the bath of liquid medium to be treated, the use of such rinsing liquid does not significantly reduce the capacity of the apparatus. On the other hand the purity of the extracted material is considerably increased by using such a device.

The rubber scraper or lip is preferably associated with an inclined drain which communicates with the bath of liquid medium to be treated and which allows the liquid pressed out of the absorbing material as a rinsing liquid to be returned to said bath.

The apparatus of the invention also allows the use of scrapers which are strongly pressed against the exterior surface of the outer drum and which effect an almost total removal of solids therefrom because said scrapers are not in direct contact with the absorbing material and consequently do not have any adverse influence on said material.

The drum wall of the outer drum preferably consists of a perforated metal plate covered by a filter cloth. By using filter cloth to cover the perforations of the drum wall, various types of absorbing material can be used in the apparatus by merely adjusting the mesh size of the filter cloth to the absorbing material used. Thus, the same exterior drum may be used in connection with different types of absorbing material.

The filter cloth is preferably made from a plastics material and preferably is a nylon fabric. In practice a nylon fabric having mesh sizes of about 200 μm have been found particularly suitable. A nylon fabric is preferred because of its high abrasive strength which enables it to resist the influences of devices for removing solids and devices for collecting liquid removed from the absorbed material. Furthermore, the surface properties of nylon fabrics are such that the solids are easily released from said fabrics.

The drum wall of the outer drum preferably comprises a removable section for use in the introduction and discharge of absorbing material from the outer drum. The introduction of absorbing material is preferably carried out by stopping the rotation of the outer drum in a position at which said section is at its highest point. By allowing the inner drum to rotate in a direction which is opposite to the normal direction of rotation and by dosing absorbing material through a funnel inserted in the opening in the outer drum, the space between the two drums are filled. The discharge of absorbing material may be effected by stopping the rotation of the exterior drum after removing the above mentioned section of the drum wall and in a position in which the above mentioned opening is located below the axis of rotation and by allowing the inner drum to continue its rotation.

The exterior surface of the inner drum is preferably provided with ribs extending longitudinally of said drum. Such ribs improve the movement of absorbing material and especially in the area in which the material is non-compressed.

The inner drum preferably rotates at the same speed as that of the exterior drum, e.g. at a speed of 10 rpm.

The absorbing material is preferably a granular foamed plastics material which allows the absorption to take place by capillary effect from different directions. The absorbing material is e.g. polyether foam having a density of 20-50 kg/m$^3$. Such a material is inexpensive because it can be obtained as a waste material formed in the production of foam mattresses.

Another advantage of using granular foamed plastics material as absorbing material in the apparatus of the invention instead of using a band attached to the exterior surface of the drum as in the prior art apparatus is that by using a granular material, the liquid can be absorbed in the material from many sides due to the movement of the granules relative to one another during the rotation of the drums. Consequently, the lifetime of the absorption material is increased. Furthermore, supplementary amounts of absorbing material for replacing decomposed material can be introduced at short stops of the apparatus.

The absorbing material, however, may also be present in the form of a loose band.

The means for collecting liquid pressed out of the absorbing material preferably comprises a roller or a guide plate which is kept pressed against the exterior surface of the outer drum and which is connected with means for collecting the liquid removed.

DESCRIPTION OF THE PREFERRED EMBODIMENT

Figure 1:
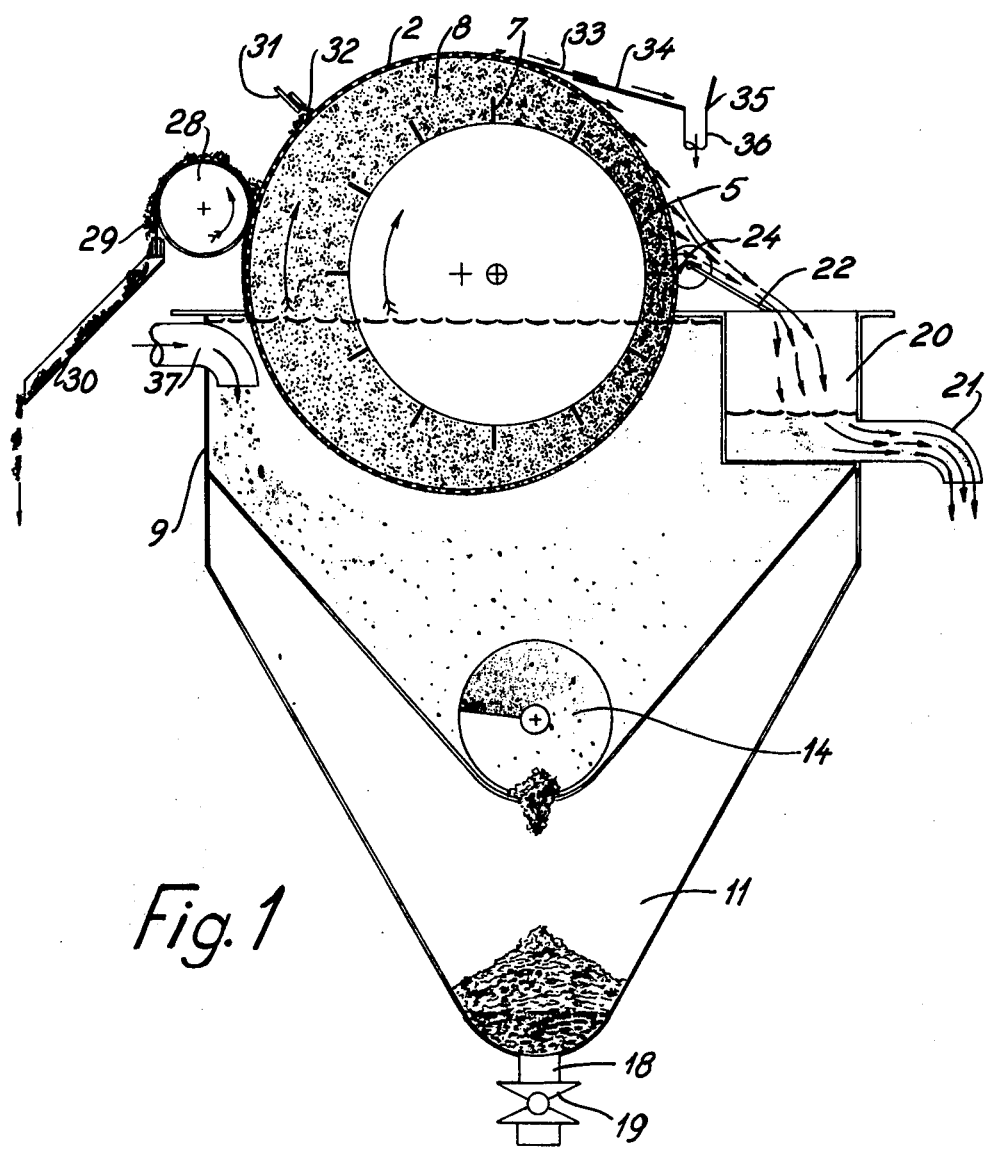
FIG. 1 shows a cross-sectional view in a plane perpendicular to the axis of rotation of the outer drum of a preferred embodiment of the apparatus of the invention.
Figure 2:
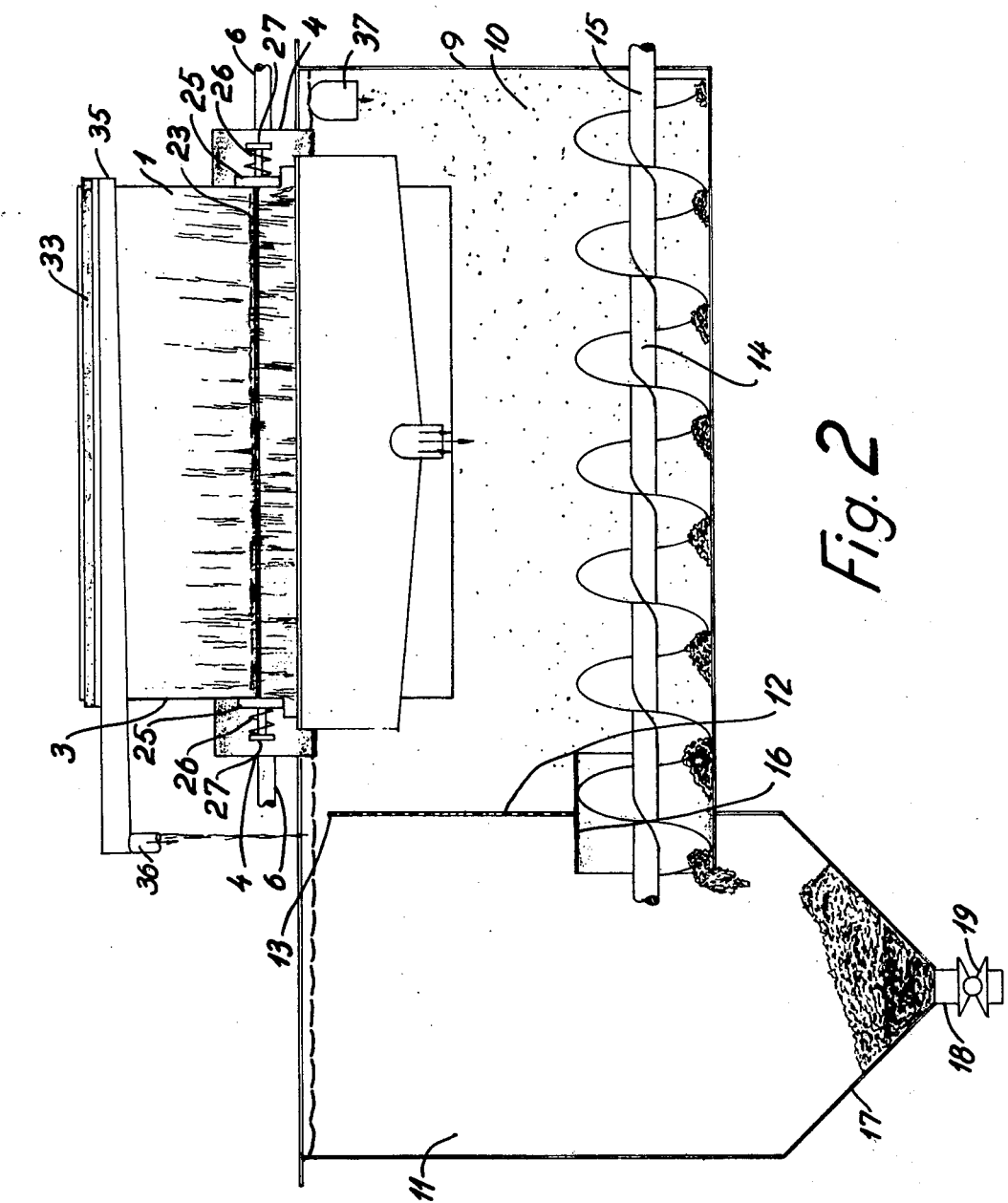
FIG. 2 shows a side elevational view and partially in in section of the apparatus illustrated in FIG. 1.

In the drawings 1 represents an outer drum having a perforated drum wall 2 which is coated with a filter cloth (not shown). The drum 1 is by means of two end plates 3 attached to two hollow journals 4, of which one is connected to driving means (not shown). An inner drum 5 having a liquid-impermeable drum wall is mounted within the outer drum 1 and eccentrically relative thereto. The ends of the inner drum 5 are provided with journals 6, of which one is connected with driving means (not shown). At the exterior surface of the inner drum 5 there are provided ribs 7 extending over the full length of the drum and longitudinally thereof. The space between the outer drum 1 and the inner drum 5 is filled with a loose granular foamed plastics material 8.

The outer drum 1 is mounted partially immersed in a liquid bath contained in a container 9 comprising a filtration compartment 10 and a discharge compartment 11. These compartments are separated by a plate 12 having an upper edge 13 located below the normal level of the liquid in the container 9. In the lower portion of the compartment 10 which is downwardly tapered there is provided a screw conveyor 14 having a shaft connected to a driving means (not shown). The screw conveyor 14 extends through a pipe section 16 through the plate 12 and terminates a short distance within the compartment 11. The lower portion 17 of the compartment 11 is downwardly tapered and terminates in a discharge pipe 18 comprising a valve 19.

At one side of the container 9 there is provided a liquid collecting chamber 20 having a discharge pipe 21. Located above the liquid collecting chamber 20 there is provided a guide plate 22 extending over the full length of the outer drum and being attached to a longitudinally extending rod 23. The edge of the guide plate 22 facing the outer drum 1 is connected to a rubber lip 24 which at its outer edge contacts the exterior surface of the drum 1. At each end of the drum 1 a sealing disc 25 which is displaceable on the rod 23 is maintained in contact with the end plate 3 by a spring 26 which at its outer end contacts a stop 27 mounted on the rod 23.

At the diametrically opposite side of the drum 1 there is mounted a discharge roller 28 extending parallel with the drum 1 and rolling thereon. At the side of the discharge roller 28 which is diametrically opposite to the zone in which it is in contact with the outer drum an essentially vertical scraper 29 is provided. At the upper edge of the scraper 29 it contacts the roller and the lower edge of said scraper is mounted above an inclined chute 30, the lower end of which is located outside the container 9.

Between the discharge roller 28 and the guide plate 22 there is mounted a rubber scraper 32 supported by a holder 31 and a soft rubber lip 33 which is attached to the upper edge of an inclined plate 34. The lower edge of the plate 34 is connected to an inclined drain 35 having at its lower end a discharge pipe 36 terminating above the compartment 11.

The apparatus illustrated further comprises a pipe 37 for supplying liquid medium to the compartment 10 of the container 9.

The apparatus illustrated operates as follows:

While introducing liquid medium into the compartment 10 of the container 9, the outer drum 1, the inner drum 5 and the screw conveyor 14 are rotated by the driving means (not shown). Such driving means may be an electric motor having pinions for effecting a syncronous rotation of the drums 1 and 5 and the screw conveyor 14.

During the pressure release which takes place while the absorbing foamed material 8 through the drum wall 2 is in contact with the liquid medium in the compartment 10, a quick and extensive absorption of liquid in the material 8 takes place. At the same time solids contained in the liquid medium and unable to penetrate through the filter cloth are deposited thereon so as to form a layer. When said layer contacts the discharge roller 28, a major portion thereof is transferred to said roller. The layer transferred is removed from the discharge roller 28 by the scraper 29 and falls down onto the chute 30 from which it is moved outside of the apparatus. During the continued rotation of the outer drum 1 the exterior surface thereof contacts the rubber lip 32 which removes additional amounts of solids. The solids thus removed falls down into the zone between the outer drum 1 and the discharge roller 28 and are introduced onto said roller 28.

When the drum 1 is further rotated, an initial compression of the absorbing material 8 takes place. Consequently, liquid is pressed out through the drum wall 2. The liquid thus removed is collected by the rubber lip 33 and is passed down along the plate 34 to the drain 35 from which it is returned to the container 9 through the pipe 36 terminating above the compartment 11. During this movement of liquid through the drum wall 2, both the drum wall 2 and the filter cloth is rinsed. When the absorbing material 8 is further compressed in the narrow zone between the inner surface of the outer drum 1 and the exterior surface of the inner drum 5 into which zone the material is transported by means of the ribs 7, the absorbed liquid is squeezed out of the absorbing material and passes through the drum wall 2 and the filter cloth. The liquid thus removed from the absorbing material flows against the rubber lip 24 and from this lip down along the guide plate 22 and into the liquid collection chamber 20 from which the liquid is removed through the discharge pipe 21.

After having passed the zone adjacent to the rubber lip 24, the material 8 expands and during said expansion it is contacted with the liquid medium contained in the container 9. Consequently, a renewed absorption of liquid takes place and the process is repeated as described above.

During the separation of liquid from the liquid medium contained in the container 9, solids are concentrated at the bottom of the compartment 10. By rotating the screw conveyor 14, the solids precipitated are moved into the compartment 11 in which they are collected at the bottom 17 thereof. The collected solids may be removed therefrom through the pipe 18 and the valve 19 or may be removed by using a suction pipe which is lowered into the compartment 11.

By adjusting the location of the rubber lip 33, the rinsing of the drum wall 2 and the filter cloth and consequently the recycled amount of liquid may be controlled.

I claim:

1. An apparatus for the recovery of liquid from a liquid medium containing solids, comprising a container, an inlet for supplying liquid medium to said container, a rotatable outer drum having a drum wall capable of filtering said solids and containing loose, compressible, resilient, liquid-absorbing material, a rotatable inner drum having a liquid impervious drum wall and being mounted for rotation within and eccentrically relative to said outer drum, said inner drum forming with said outer drum a compression zone for compressing said liquid-absorbing material and for passing said liquid through said outer drum, and a pressure relief zone for expanding said liquid-absorbing material and for absorbing liquid passing through said outer drum from said container, driving means for rotating the outer and inner drums in the same direction into the liquid medium within said container, transporting means located within a zone defined between the interior surface of said outer drum and the exterior surface of said inner drum and rotatable with said drums for transporting liquid-absorbing material through said compression zone and subsequently through said pressure-relief zone, solids removal means contacting the exterior surface of said outer drum to remove solids deposited thereon, said means being located between said pressure-relief zone and said compression zone, means for collecting liquid removed from said liquid-absorbing material in said compression zone and an outlet for discharging the collected liquid.

2. An apparatus as in claim 1, wherein the means for removing solids from the exterior surface of the outer drum comprises a roller extending parallel to the axis of rotation of said outer drum and rolling on and together with said outer drum.

3. An apparatus as in claim 2, wherein said roller has a coating of a plastics material thereon.

4. An apparatus as in claim 1, wherein the means for removing solids from the exterior surface of the outer drum comprises a rubber lip which lightly contacts the exterior surface of the outer drum and which is located in a zone, between said pressure-relief zone and said compression zone, in which the liquid-absorbing material is under a light compression.

5. An apparatus as in claim 4, wherein said rubber lip is associated with a drain communicating with a bath of liquid medium to be treated.

6. An apparatus as in claim 1, wherein a screw conveyor extending through a hole in a side wall of the container is mounted for rotation at the bottom of said container.

7. An apparatus as in claim 1, wherein the drum wall of the outer drum comprises a perforated metal plate covered by a filter cloth.

8. An apparatus as in claim 7, wherein the filter cloth is made from a nylon fabric.

9. An apparatus as in claim 1, wherein the drum wall of the outer drum comprises a removable section.

10. An apparatus as in claim 1, wherein said transporting means comprises longitudinally extending ribs provided on the exterior surface of the inner drum.

11. An apparatus as in claim 1, wherein the liquid-absorbing material comprises pieces of a foamed plastics material.

12. An apparatus as in claim 1, wherein the means for collecting liquid removed from the liquid-absorbing material comprises a rubber lip which is kept pressed against the exterior surface of the outer drum in or below said compression zone.

* * * * *